Jan. 19, 1965   J. E. FIELDEN   3,166,246
CONTROL OF TEMPERATURE ON MULTIPLE PROCESSES
Filed Feb. 7, 1962   2 Sheets-Sheet 2

United States Patent Office 3,166,246
Patented Jan. 19, 1965

3,166,246
CONTROL OF TEMPERATURE ON MULTIPLE PROCESSES
John E. Fielden, Altrincham, England, assignor to Fielden Electronics Limited, Manchester, England, a British company
Filed Feb. 7, 1962, Ser. No. 171,677
Claims priority, application Great Britain, Feb. 7, 1961, 4,501/61
2 Claims. (Cl. 236—1)

In many industrial processes where it is desired to maintain a large number of units at a fixed constant temperature, the control of each unit tends to become both complex and expensive unless simple expanding elements such as bi-metal strips, expanding liquids, expanding rods etc., are used. However, the long term stability of such elements leaves much to be desired due to the fatigue in the elastic constants of the materials used. Electronic control has been used but the disadvantages are that use is made of either a suitable measuring element, normally a thermocouple, which is simple and inexpensive, but due to its low output of energy needs expensive amplification to effect satisfactory control, or alternatively a resistance bulb which may be made to carry a reasonable current and its output can be used relatively inexpensively to effect control, but unfortunately, a precision calibrated resistance bulb is an expensive item.

An object of the present invention is to provide an improved means of controlling temperature, which means is relatively inexpensive.

According to the invention an uncalibrated resistance of suitable thermal co-efficient of electrical resistance is positioned at each heat zone to be controlled and each such resistance is connected in series with an adjustable resistance of such range value that when the series combinations are connected across an electrical source, the voltage drops across each uncalibrated resistance may be made equal irrespective of their individual resistance values, the potential at each junction of uncalibrated resistance and adjustable resistance being compared with a reference potential corresponding to the desired temperature and the resultant signal being used to control a heater at the respective heat zone.

The uncalibrated resistances may be pieces of wire wound or placed on suitable elements in the heat zones. Examples of convenient wire materials are copper, platinum and nickel. Alternatively thermistors may be used.

Embodiments of the invention will now be described by way of example, with reference to the accompanying drawing in which.

Figure 1:
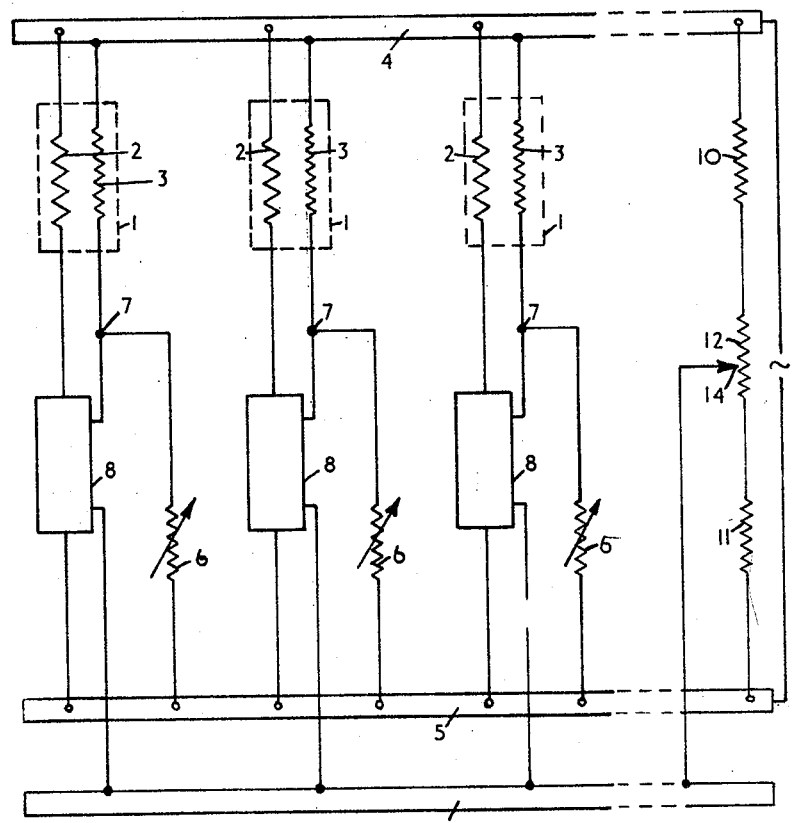
FIGURE 1 is a circuit diagram of a temperature controlling means.

For the sake of clarity, only three heat zones 1 are shown in FIGURE 1 but any required number may be provided according to the particular application. A typical application of the invention is in the processing of synthetic yarns on frames where there are multiple heat zones through which the yarns are passed, all the zones being required to be controlled at the same precise temperature.

Each heat zone 1 includes a heater 2 and a sensing resistance 3, and in series with each resistance 3 across supply rails 4 and 5 is a variable resistance 6. The resistances 3 are all of the same material but their absolute values of resistance at any temperature need not be the same or even known. The voltage at the junction points 7 of the resistances 3 and 6 are all adjusted to be the same at any convenient temperature, e.g. ambient temperature and thereafter, if all the heat zones 1 are at any same temperature the voltages at all the junctions 7 will be at a same value corresponding to the temperature.

The heater 2 of each heat zone is controlled by a controller 8 in accordance with the results of a comparison between the respective junction voltage and a reference voltage provided on a rail 9, which reference voltage corresponds to the desired temperature of the heat zones and is provided by a potential divider network comprising fixed resistors 10 and 11, and suitably calibrated adjustable resistor 12, the reference voltage being taken from the slider 14. In effect each pair of resistances 3 and 6 corresponding to a particular heat zone together with resistances 10 and 11 form a bridge so that there are a multiplicity of bridges of which two arms (10 and 11) are common to all the bridges. Resistance 12 is included, in proportions determined by the slider 14, with the two arms (10 and 11). If desired, an impedance reducing amplifier may be inserted between the slider 14 and the rail 9.

Figure 2:
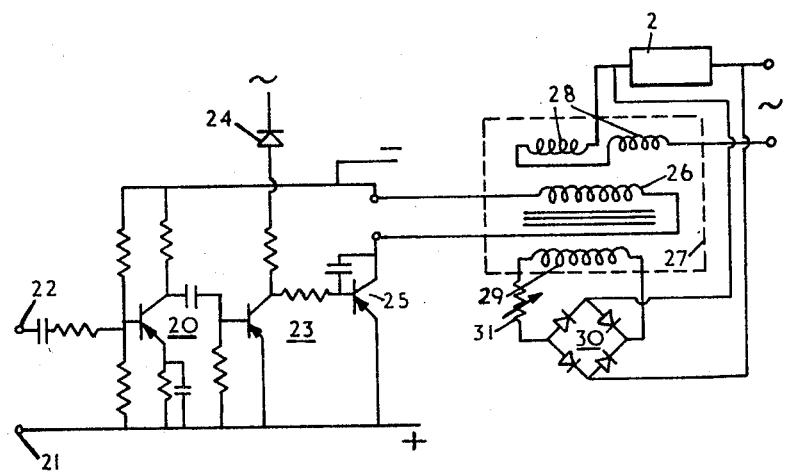
FIGURE 2 is a circuit diagram of an amplifier arrangement which may be utilised in the means of FIGURE 1.

FIGURE 2 shows an amplifier arrangement which may be used for each of the controllers 8 shown in FIGURE 1. The amplifier arrangement has a D.C. supply applied at terminals "+" and "−" and comprises a preamplifier stage including a transistor 20, the rail 9 being connected to input terminal 21 and the junction 7 being connected to input terminal 22. Thus the difference signal is amplified in transistor 20 and then fed to a phase comparison stage including a transistor 23, the amplified difference signal being fed to the base electrode and a reference phase A.C. signal from a source (not shown) being fed to the collector via a rectifier 24. The other connection for the source of the reference phase A.C. signal is the "+" terminal. The resultant output signal, which is now indicative of the sign as well as the magnitude of the difference between the reference voltage and the voltage at junction 7, is amplified in power amplifying transistor 25 which includes in its collector circuit a control winding 26 of a saturable reactor arrangement 27 of which the main windings 28 are in series with the heater 2 of the heat zone 1. Variation in the current through control winding 26 varies the impedance of the windings 28 and hence the power consumption of the heater 2. A positive feedback winding 29 supplied with D.C. from a bridge rectifier 30 via a control rheostat 31, is energised by the voltage drop across the heater thus assisting the action of the reactor.

Figure 3:
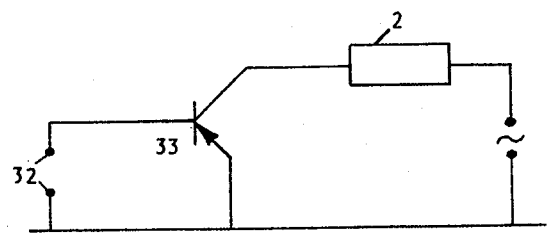
FIGURE 3 is a circuit diagram of a modification of the amplifier arrangement shown in FIGURE 2.

The reactor 27 may be replaced by a semi-conductor device such as a power transistor for low powers or a silicon controlled rectifier for higher powers. As shown in FIGURE 3 the output of transistor 25 is fed via terminals 32 into a silicon controlled rectifier 33 with the heater 2 to be controlled in its collector circuit.

In the specific application to the processing of yarn it may be desirable to provide an information channel, firstly, in order that the initial settings may be achieved with accuracy and secondly, in order that the process can be constantly monitored. To allow this, thermocouples can also be included in the heat zones and the equipment adjusted according to the E.M.F.'s produced by each of the thermocouples in each heat zone.

What is claimed is:

1. Means for the control of temperature on multiple processes, comprising a multiplicity of random value resistances, all of the same thermal co-efficient of electrical resistance, each positioned at a separate heat zone to be controlled, a similar multiplicity of adjustable resistances each connected in series with a said random resistance, an electrical source across which all of the series combinations of random resistances and adjustable resistances are connected, and a source of reference voltage, the value of which corresponds to the desired temperature of all the zones, the range of adjustment of each adjustable resistance being such that the voltage drops across the random resistance may be made equal irrespective of their individual resistance values, the voltage at each junction of random resistance and adjustable resistance being compared with the reference voltage and the resultant signal being used to control a heater at the respective heat zone to maintain said desired temperature.

2. Means as claimed in claim 1 wherein the random resistance-adjustable resistance combinations are each two adjacent arms of a multiplicity of bridges of which the other two arms are common to all the bridges and are formed by a potentiometer network having an adjustable tapping means for adjusting the reference voltage, the difference signal being taken from between the tapping means and the junction between the random and the adjustable resistances.

References Cited by the Examiner
UNITED STATES PATENTS

| | | | |
|---|---|---|---|
| 2,495,856 | 1/50 | Markusen. | |
| 2,713,130 | 7/55 | Weiller | 219—20.41 |
| 2,769,076 | 10/56 | Bogdan | 219—20.41 |
| 2,971,137 | 2/61 | Stewart | 219—20.41 |
| 3,040,157 | 6/62 | Hukee | 219—20.41 |

EDWARD J. MICHAEL, *Primary Examiner.*

RICHARD M. WOOD, *Examiner.*